US006928073B2

(12) United States Patent
Jones et al.

(10) Patent No.: US 6,928,073 B2
(45) Date of Patent: Aug. 9, 2005

(54) INTEGRATED CIRCUIT IMPLEMENTING PACKET TRANSMISSION

(75) Inventors: Andrew M. Jones, Redland (GB); John A. Carey, Bishopston (GB)

(73) Assignee: STMicroelectronics Ltd. (GB)

( * ) Notice: Subject to any disclaimer, the term of this patent is extended or adjusted under 35 U.S.C. 154(b) by 0 days.

(21) Appl. No.: 09/410,974

(22) Filed: Oct. 1, 1999

(65) Prior Publication Data

US 2003/0161308 A1 Aug. 28, 2003

(51) Int. Cl.$^7$ .............................................. H04L 12/56
(52) U.S. Cl. ...................... 370/389; 370/230; 370/252; 370/392; 370/395.72; 370/419; 370/422
(58) Field of Search ................................. 370/389, 230, 370/252, 392, 395.72, 419, 422, 257, 236, 282, 395.1, 395.2, 395.5, 902; 709/103, 206, 294

(56) References Cited

U.S. PATENT DOCUMENTS

| | | | | |
|---|---|---|---|---|
| 4,807,116 A | * | 2/1989 | Katzman et al. ............. | 710/266 |
| 4,814,981 A | | 3/1989 | Rubinfeld ..................... | 364/200 |
| 5,251,311 A | | 10/1993 | Kasai ........................... | 395/425 |
| 5,283,904 A | * | 2/1994 | Carson et al. ............... | 710/266 |
| 5,386,565 A | | 1/1995 | Tanaka et al. ............... | 395/700 |
| 5,423,050 A | | 6/1995 | Taylor et al. ................ | 395/575 |
| 5,434,804 A | | 7/1995 | Bock et al. .................. | 364/579 |
| 5,440,705 A | | 8/1995 | Wang et al. .............. | 395/421.1 |
| 5,442,762 A | | 8/1995 | Kato et al. | |
| 5,448,576 A | | 9/1995 | Russell ....................... | 371/22.3 |

(Continued)

FOREIGN PATENT DOCUMENTS

| | | | | |
|---|---|---|---|---|
| EP | 0165600 B1 | 11/1991 | ........... | G06F/13/36 |
| EP | 0636976 B1 | 2/1995 | ........... | G06F/11/00 |
| EP | 0636976 A1 | 2/1995 | ........... | G06F/11/00 |
| EP | 0652516 A1 | 5/1995 | ........... | G06F/11/00 |
| EP | 0702239 A2 | 3/1996 | ....... | G01R/31/3173 |
| EP | 0720092 A1 | 7/1996 | ........... | G06F/11/00 |
| EP | 0840221 A1 | * 5/1998 | ................. | 710/268 |
| EP | 0840221 A1 | 6/1998 | | |
| EP | 0933926 A1 | 8/1999 | ........... | H04N/5/00 |
| EP | 0945805 A1 | 9/1999 | ........... | G06F/12/08 |
| EP | 0959411 A1 | 11/1999 | ........... | G06F/13/24 |
| JP | PCT/JP96/02819 | 9/1996 | ............ | G06F/9/46 |
| JP | 8320796 A | 12/1996 | ............ | G06F/9/46 |
| JP | 8329687 A | 12/1996 | ........... | G11C/15/00 |
| JP | 9212358 A | 8/1997 | ............ | G06F/9/38 |
| JP | 9311786 A | 12/1997 | ............ | G06F/9/38 |
| JP | 10106269 A | 4/1998 | ........... | G06F/12/08 |
| JP | 10124484 A | 5/1998 | ........... | G06F/17/10 |
| JP | 10177520 A | 6/1998 | ........... | G06F/12/10 |

OTHER PUBLICATIONS

Georgiou C. J. et al: An Experimental Coprocessor for Implementing Persistent Objects on an IBM 4381, ACM 0–89791–238–1/87/1000–0084,1987.

(Continued)

*Primary Examiner*—Alpus H. Hsu
*Assistant Examiner*—Justin Philpott
(74) *Attorney, Agent, or Firm*—Lisa K. Jorgenson; William J. Kubida

(57) ABSTRACT

The implementation of transactions on an integrated circuit comprising a plurality of functional modules connected to a packet router is described. Each functional module generates request packets for implementing memory access operations, each request packet having an operation field comprising eight bits of which a packet type bit denotes the type of the packet, four operation family bit denote the function to be implemented by the packet and three operation qualifier bits act to qualify the function.

18 Claims, 5 Drawing Sheets

U.S. PATENT DOCUMENTS

| | | | |
|---|---|---|---|
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,592,628 A | 1/1997 | Ueno et al. | |
| 5,596,734 A | 1/1997 | Ferra | 395/825 |
| 5,598,551 A | 1/1997 | Barajas et al. | 395/484 |
| 5,608,881 A | 3/1997 | Masumura et al. | 395/306 |
| 5,613,153 A | 3/1997 | Arimilli et al. | 395/821 |
| 5,627,842 A | 5/1997 | Brown et al. | 371/22.3 |
| 5,657,273 A | 8/1997 | Ayukawa et al. | 395/189.01 |
| 5,682,545 A | 10/1997 | Kawasaki et al. | 395/800 |
| 5,704,034 A * | 12/1997 | Circello | 710/113 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,751,621 A | 5/1998 | Arakawa | 364/748.07 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,848,247 A | 12/1998 | Matsui et al. | 395/284 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,914,955 A * | 6/1999 | Rostoker et al. | 370/395.5 |
| 5,918,045 A | 6/1999 | Nishii et al. | 395/584 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,389,498 B1 * | 5/2002 | Edwards et al. | 710/268 |
| 6,397,325 B1 * | 5/2002 | Jones et al. | 710/268 |

OTHER PUBLICATIONS

Guttag, Karl M.: Tl's new MVP Chip Brings Parallel–processing Power to Multimedia Applications, Byte.

European Search Report, EP 00 30 8366, Jun. 2, 2004.

Richard York; Real Time Debug for System–on–Chip Devices; Jun. 1999; pp. 1–6.

* cited by examiner

INTEGRATED CIRCUIT IMPLEMENTING PACKET TRANSMISSION

FIELD OF THE INVENTION

The present invention relates to the transmission of packets in an integrated circuit comprising a plurality of functional modules interconnected via a packet router.

BACKGROUND TO THE INVENTION

Computer systems and integrated circuit processors exist which implement transactions with the dispatch and receipt of packets. Request packets define an operation to be performed and response packets indicate that a request has been received and whether or not it has been acted on. The integrated circuit processor can comprise a plurality of functional modules connected to a packet router for transmitting and receiving the request and response packets. Generally, the design process is such that the architecture of a processor is designed and the functional modules which are required are determined. Then, depending on the nature of the functional modules and the requirements which their nature impose on the interface to the packet router, a packet protocol is developed to suit that processor. This makes it difficult to implement different designs of a similar processor, where perhaps a functional module with different interface requirements is to be added in.

It is an aim of the present invention to provide a packet protocol which can be utilized across a number of different projects and designs. Thus, the aim is to provide a packet protocol with compact encoding but which nevertheless has artifacts providing rapid decoding of important information about the packet.

SUMMARY OF THE INVENTION

According to one aspect of the present invention there is provided an integrated circuit comprising: a plurality of functional modules interconnected via a packet router, each functional module having packet handling circuitry for generating and receiving packets conveyed by the packet router; wherein at least a first set of said functional modules, acting as initiator modules, have packet handling circuitry which includes request packet generation circuitry for generating request packets for implementing transactions, each request packet including a destination indicator identifying a destination of the packet and an operation field denoting the function to be implemented by the request packet, wherein the operation field comprises eight bits of which a packet type bit denotes the type of the packet, four operation family bits denote the function to be implemented by the packet and three operation qualifier bits act to qualify the function.

A further aspect of the invention provides an integrated circuit comprising: a plurality of function modules interconnected via a packet router, each functional module having packet handling circuitry for generating and receiving packets conveyed by the packet router; wherein at least a first set of said functional modules, acting as initiator modules, have packet handling circuitry which includes request packet generation circuitry for generating request packets for implementing transactions, each request packet including a destination indicator identifying a destination of the packet and an operation field denoting the function to be implemented by the request packet, wherein the operation field comprises eight bits of which a packet type denotes the type of the packet, four operation family bits denote the function to be implemented by the packet and three operation qualifier bits act to qualify the function, and wherein a second set of said functional modules, acting as target modules, each have packet handling circuitry which includes packet receiver logic for receiving said request packets and for generating respective response packets, wherein the packet type bit distinguishes request packets and response packets.

In the integrated circuit described herein, the function in each request packet is a memory access operation. However, it will readily be appreciated that the protocol can be extended to provide additional operations as required by the particular design.

In the preferred embodiment, one of said operation family bits distinguishes between primitive memory access operations involving a single request and response and compound memory access operations involving a plurality of requests and responses.

In the embodiment described herein, each request packet includes a data object, the size of which is denoted by the three bit operation qualifier.

A further embodiment of the present invention provides an initiator functional module for connection in an integrated circuit comprising: an interface for supplying and receiving packets to and from the functional module, said interface being connected to a port for connecting the functional module to a packet router; packet handling circuitry for handling said packets and including request packet generating logic which generates request packets for supply to the packet router via the interface, each request packet having a destination indicator identifying a destination of the packet and an operation field denoting the function to be implemented by the request packet, wherein the operation field comprises eight bits of which a packet type bit denotes the type of the packet, four operation family bits denote the function to be implemented by the packet and three operation qualifier bits act to qualify the function.

Another aspect of the invention provides a target functional module for connection in an integrated circuit comprising: an interface for supplying and receiving packets to and from the functional module, said interface being connected to a port for connecting a functional module to a packet router; packet receiver logic which is operable to receive request packets supplied from the packet router via the interface to the target functional module, each request packet having an operation field denoting the function to be implemented by the request packet, said operation field including four operation family bits denoting the function to be implemented by the packet, one of said operation family bits distinguishing between primitive memory access operations and complex memory access operations, wherein the packet receiver logic comprises means for detecting the status of said one operation family bit to determine whether the memory access operation is primitive or compound.

A further aspect of the invention provides a method of implementing transactions in an integrated circuit comprising a plurality of functional modules interconnected via a packet router, the method comprising: at one of said functional modules acting as an initiator module, generating a request packet including a destination indicator identifying a destination of the packet and an operation field denoting the function to be implemented by the request packet, wherein the operation field comprises eight bits of which a packet type bit denotes the type of a packet, four operation family bits denote the function to be implemented by the packet and three operation qualifier bits act to qualify the function; at the destination indicated by the destination indicator, receiving said request packet and identifying the function to be implemented from the four operation family bits and the operation qualifier bits; and generating a response packet for transmission to the initiator functional module, wherein the packet type bit distinguishes between request packets and response packets.

For a better understanding of the present invention and to show how the same may be carried into effect reference will now be made to the following drawings.

DESCRIPTION OF THE PREFERRED EMBODIMENT

Figure 1:
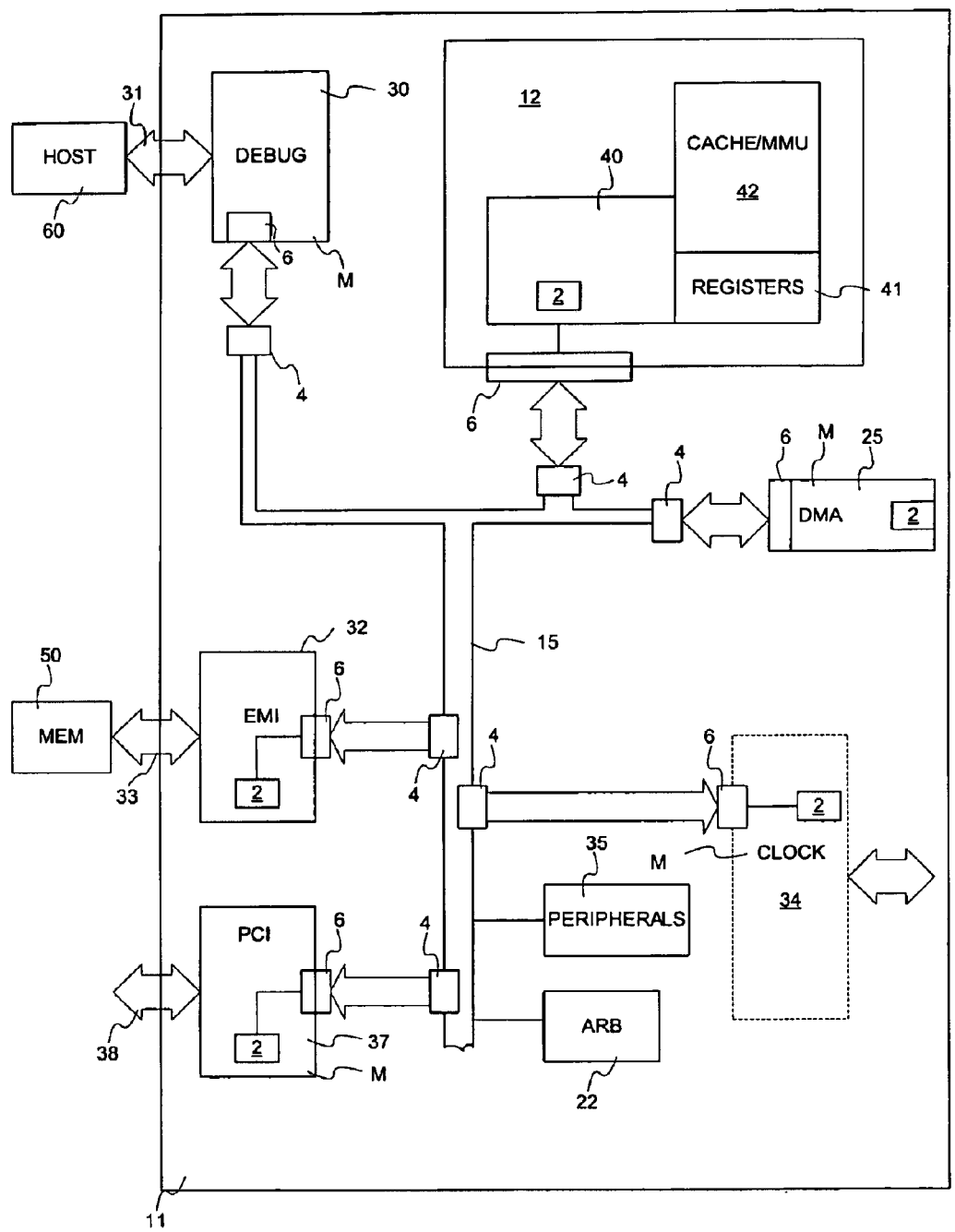
FIG. 1 is a block diagram of a processor embodied as an integrated circuit with an external memory.

FIG. 1 illustrates an integrated circuit according to an embodiment of the invention. On each chip 11 a central processing unit (CPU) 12 is connected to a plurality of modules M by a data and address path 15 arranged to carry bit packets in parallel form. The modules as well as the CPU unit 12 each include packet handling circuitry 2 used in the generation and receipt of bit packets on the path 15. The path 15 is referred to herein as a packet router or routing bus. Two main types of packet are used on the data and address path 15, each including a destination indicator or address to indicate the required destination module connected to the path 15. The packets include request packets which are generated by an initiator module and response packets which are generated by a target module. A module may act as both an initiator and a target. Response packets are of two types, ordinary responses or error responses. These are discussed in more detail later. The modules M as well as the CPU unit 12 each packet handling circuitry 2 for handling packet formation and receipt of requests, ordinary responses and error responses.

The routing bus 15 provides bi-directional connections to each module. In this example the bus consists of parallel request and response buses and a dedicated control bus provided respectively.

for each module so as to link the modules to an arbitration unit 22. Each module is connected to the routing bus via a port 4 and is provided with an interface 6 incorporating a state machine so as to interchange control signals and data between the port 4 and the interface 6.

Figure 1A:
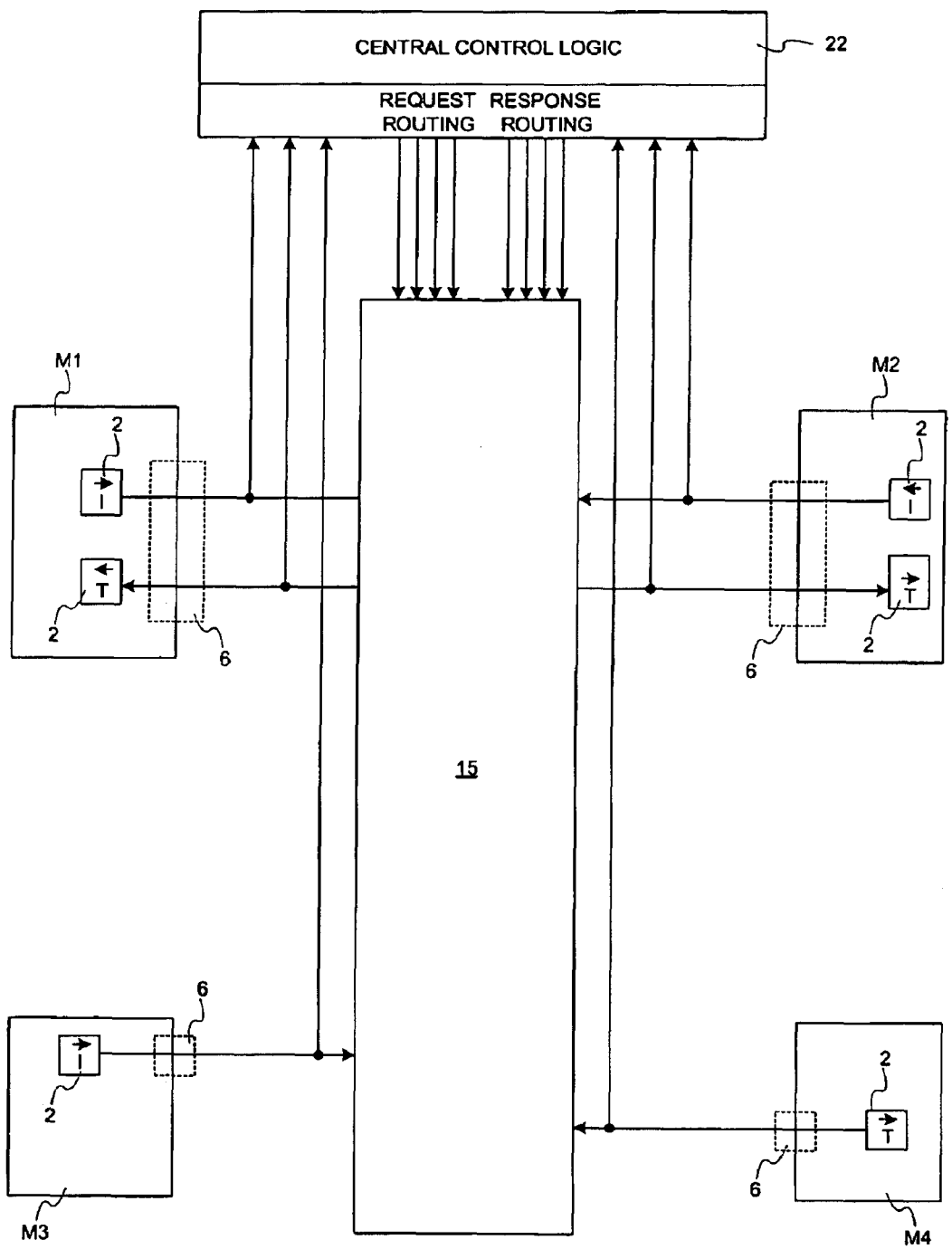
FIG. 1A is a block diagram illustrating initiator and target modules.

FIG. 1A is a block diagram illustrating relevant functional components of the chip of FIG. 1 to illustrate the concept of targets and initiator modules. The modules are labeled M1, M2, M3 and M4 and may include any of the modules M already described with reference to FIG. 1. Modules M1 and M2 both have target and initiator functions as illustrated by the separate target and initiator parts of the interface 6 of each module. Module M3 acts only as an initiator and module M4 acts only as a target. Signals from the interfaces 6 are supplied to central control logic which forms part of the arbitration unit 22. The arbitration unit 22 issues request routing control signals and response routing control signals to the routing bus network 15.

In the example shown in FIG. 1, the various modules M include a debug module 30 which includes an external link 31 for transmitting packets across the chip boundary (to, for example, host 60), an external memory interface (EMI) 32 having an external bus connection 33 leading to an external memory 50, clock circuitry 34, various peripheral interfaces 35, a peripheral component interface PCT) 37 with an external connection 38, a DMA unit 25 for effecting memory accesses as well as the arbitration unit 22. The CPU unit 12 includes a plurality of instruction execution units 40, a plurality of registers 41, and a cache 42. The CPU unit 12 also includes packet handling circuitry 2 connected to the execution units 40. The routing bus 15 is arranged to transmit to the modules M both request and response packets for effecting memory access transactions as discussed further herein. These packets may be generated by software as a result of instruction execution by a CPU or by hardware responsive to detection of a packet. Initiator modules may be autonomous and generate packets without software intervention. The packets may be generated on-chip and distributed on the bus 15 or generated off-chip and supplied to the on-chip bus 15 through an external connection such as the link 31 associated with the debug module 30.

The CPU 12 can be operated in a conventional manner receiving instructions from a program memory and effecting data read or write operations with the cache 42 on-chip. Additionally external memory accesses for read or write operations may be made through the external memory interface 32 and bus connection 33 to the external memory 50.

The debug module 30 provides an important external communication which may be used for example in debugging procedures. The on-chip CPU 12 may obtain instruction code (by memory access packets) for execution from an external source such as a debugging host 60 communicating through the link 31. Communications on the routing bus 15 are carried out in bit parallel format. It is possible to reduce the parallelism of packets obtained from the routing bus 15 so that they are output in bit serial format through the link 31.

Each packet is constructed from a series of cells or tokens, the end of the packet being identified by an end of packet (eop) cell. The construction of the cells is discussed in more detail later. Briefly, each packet cell comprises a number of fields which characterize the packet. Each packet is transmitted by a source module and is directed to a destination module. An initiator can issue request packets and act on response packets. A target can receive and act on requests and issue responses. Thus, a source module may be an initiator or a target depending on the nature of the packet. The source module uses its associated port 4 to transmit a packet onto the routing bus 15. The routing bus 15 arranges for the packet to be routed to the port associated with the destination module. The destination module then receives that packet from its associated port. The source and destination modules can be the same.

A transaction is an exchange of packets that allows a module to access the state of another module. A transaction comprises the transfer of a request packet from a source module to a destination module, followed by the transfer of a response packet from that destination module (now acting as a responding module) back to the source module which made the original request. The request packet initiates a transaction and its contents determine the access to be made.

The response packet completes the transaction and its contents indicate the result of the access. A response packet also indicates whether the request was valid or not. If the request was valid, a so-called ordinary response packet is sent. If the request was invalid, an error response packet is transmitted. Some modules act only as initiators and thus their packet handling circuitry is capable only of the generation of request packets. Some modules act only as targets (e.g., module M4 in FIG. 1A, and therefore their packet handling circuitry 2 is capable only of generating response packets. In that case, both ordinary responses and error responses can be generated. However, some modules are capable of acting both as initiators or as targets (e.g., modules M1 and M2 in FIGS. 1A and 1B), and their packet handling circuitry is capable of generating both request and response type packets.

Figure 2:
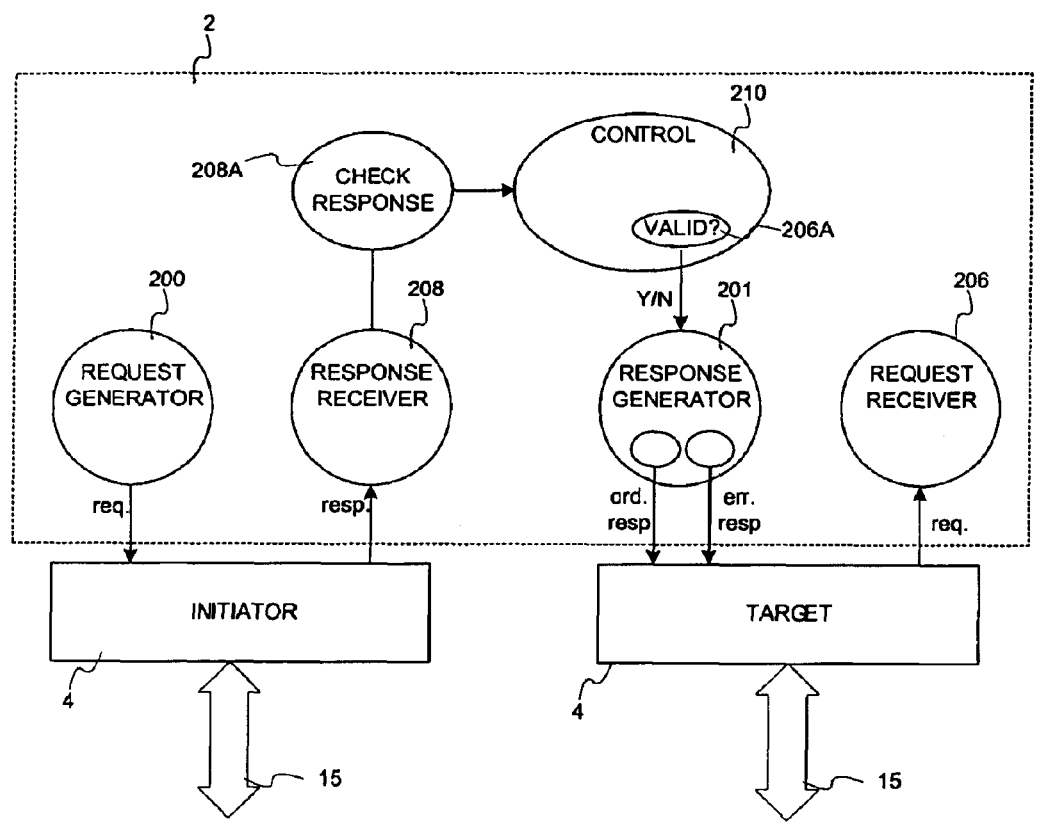
FIG. 2 shows the packet handling logic.

A logic diagram for the relevant parts of a module capable of both these functions is shown in FIG. 2. The packet handler 2 comprises request generator logic 200, ordinary response generator logic 202, error response generator logic 204, request packet receiver logic 206, and response packet receiver logic 208. These are all under the general functional control of a control logic block 210. A request packet is constructed by a requesting module when that module needs to make an access to a particular target module. As discussed more fully later, the address of the target module is recorded in the request packet destination field. The requesting module acts as a source of the request packet and sends that packet into the routing bus 15. The routing bus 15 arranges for that request packet to be routed from its source to its destination. The destination receives the request packet from the routing bus 15. The request packet receiver logic 206 checks whether or not the request is valid at 206a. If it is valid, an ordinary response packet is generated by the ordinary response generator logic 202 and the module services the requested access according to the information in the received request packet. If the request is not valid, the error response generator logic 204 generates an error response packet.

A response packet (ordinary or error) is constructed in order to reply to the request packet. The module which originated the request packet is recorded in the response packet's destination field. This is discussed more fully later. The responding module is the source of the response packet and sends that packet onto the routing bus 15. This is done by the module interface 6. The response receiver logic 208 receives the response packet from the routing bus 15 and checks the response at 208a. If the response can be matched to the original request, the transaction is completed.

Figure 3:
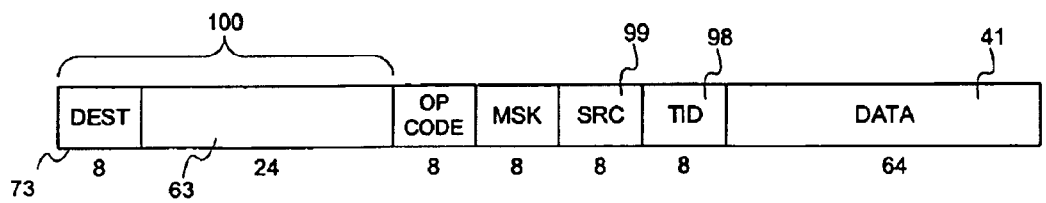
FIGS. 3 and 4 are packet formats of request and response packets respectively conveyed by a communication path of the processor.
Figure 4:
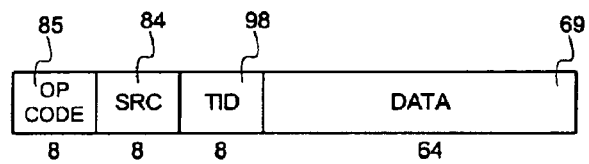

The format of the multibit packets used on the routing bus 15 in the microcomputer are illustrated by way of example in FIGS. 3 and 4. FIG. 3 shows the information carried by each request cell.

Each packet is constructed from one or more cell framed using an end of packet (eop) signal. Each request cell comprises a 32-bit address field which indicates the destination address of the packet. In the described embodiment, an address comprises an 8-bit destination field 73 followed by a 24 bit offset field 63 which identifies a memory location within the destination. The offset information is present in request packets to identify the particular memory location at which the request is targeted. The destination field 73 is 1-byte field used to route the packet to the destination or target module. A byte 74 conveys the opcode which identifies the nature of the requested access. For example, the opcode can define a load word access for reading a register value and a store word access for writing a register value.

The encoding of the opcode byte is discussed in more detail hereinafter. A SRC byte 99 is a source field which identifies the source module and which is used as a return address for a response packet. A TID byte 98 conveys a transaction identifier which is used by the requester to associate responses with requests. The TID enables a module to identify response packets corresponding to respective request packets in cases where a plurality of request packets have been sent before response packets have been received for each request packet. A 64-bit data field 71 holds data to be conveyed with the request.

FIG. 4 illustrates the construction of a response packet cell. If the response packet contains more information than a single cell, it is constructed from a sequence of cells framed using a response end of packet (R-EOP) signal. The response packet includes an opcode byte 85 which denotes the nature of the requested transaction, a byte 84 which identifies the source module of the requesting packet which gave rise to the response and which acts as the return address for the response packet, a transaction identifier 98 and a data field 69.

The opcode field 74 of a request packet has a number of different possible encodings to define the nature of the requested access. Bit 7 of the opcode is used to identify whether it is a request or a response packet however. With bit 7 set to one, the packet is a response and which bit 7 set to zero, the packet is a request. The opcode field 85 of the response packet thus has bit 7 set to one in each case. In addition, bit 0 is set to zero if the response is a ordinary response (successful transaction), and is set to one if it is an error response. Thus, the opcode field can quickly and readily identify whether a packet is a request or a response and whether the response is an ordinary response or an error response.

Figure 1B:
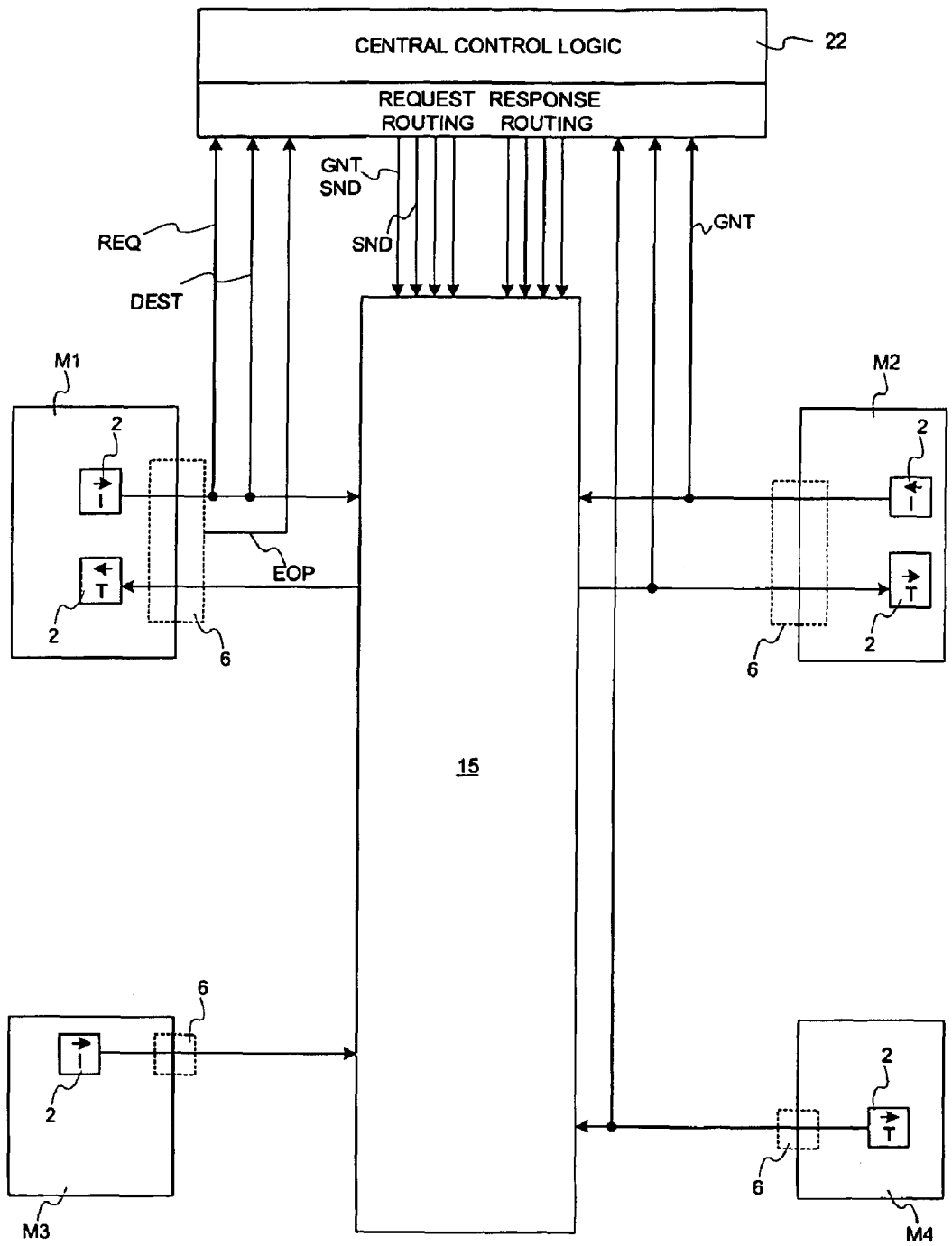
FIG. 1B is a block diagram illustrating arbitration.

When a module has a packet to send to another module, for example from the CPU unit 12 to the EMI module 32, it first signals this by asserting a request signal "req" to a dedicated line connecting that module to the central arbitration unit 22. Reference is made to FIG. 1B where M1 is the initiator module and M2 the target module. It also outputs an eight bit signal (DEST) on a destination bus to indicate to the arbitration unit 22 the intended destination of the packet it wishes to transmit. A module M which is able to receive a packet from the routing bus 15 will assert a grant signal "gnt" to the central arbitration unit 22 regardless of whether a packet is available to be fed to that destination or not. When the central arbitration unit 22 determines that a module wishes to send a packet to a destination and independently the destination has indicated that it is able to receive a packet from the bus 15, the unit 22 arranges for the transfer to take place. The unit 22 asserts a grant send signal "gnt_snd" to the appropriate interface 6 causing the sending module to put the packet onto the bus 15. The arbitration unit 22 then asserts a send signal "snd" which signals to the receiving module that it should accept the transfers currently on the bus 15. The packet transmission concludes when the sender asserts an "end of packet send" signal concurrently with the last transfer of packet data on the bus 15.

Although this description is made with reference to request packets, a similar arbitration mechanism applies for response packets.

Figure 5:
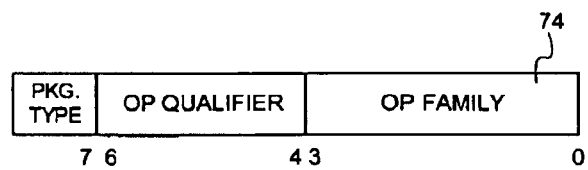
FIG. 5 illustrates the opcode field of the request packet.

FIG. 5 illustrates the bit encoding of the opcode field 74 for request packets illustrated in FIG. 3. Bit 7 identifies the packet type, that is, whether the packet is a response or a request. With bit 7 set to one, this denotes that the packet is a response packet and with bit 7 set to zero this denotes that the packet is a request packet.

Bits 0 to 3 identify the operation family which is encoded as illustrated in Table I.

TABLE I

| | |
|---|---|
| <0011> | reserved |
| <0100> | readmodwrite |
| <0101> | swap |
| <0110> | reserved |
| <0111> | reserved |
| <1000> | cache operations |
| <1001> | load group operations |
| <1010> | store group operations |
| <1011–1100> | reserved |
| <1101> | reserved |
| <1111> | user defined operation |

Each operation-family may be further qualified by an operation qualifier at bits 6 to 4. For the operation load, store, readmodwrite and swap, bit 6 to 4 indicate the size of the data element the operation is working on. It uses a compact encoding $2^n$ to represent the size. The values are defined as in Table II.

TABLE II

| | |
|---|---|
| <000> | byte |
| <001> | 2 byte |
| <010> | 4 byte |
| <011> | 8 byte |
| <100> | 16 byte |
| <101> | 32 byte |
| <110> | 64 byte |

This encoding provides a number of advantages as mentioned below.

The use of a single bit, bit 7 to denote the difference between request packets and response packets allows multiplexed request/response traffic to be implemented while rapidly detecting the difference between a request packet and a response packet.

The basic memory operations have bits 2 and 3 set to zero which allows them to be rapidly determined. These basic memory operations are load and store.

All normal memory operations, including basic memory operations have bit 3 set to zero. This includes load, store, readmodwrite and swap.

Complex operations such as the cache operations, load group operations and store group operations have bit 3 set to one. This information simplifies the design of peripherals thus reducing the decode complexity.

The 8 bit opcode uniquely defines the operation to be carried out by the request packet without any "reference to the precise implementation of the system on which the packet is to be used.

The operation types which are supported in the described embodiment are summarized in Table III.

TABLE III

| operation | name | qualifiers | comment |
|---|---|---|---|
| primitive operations | load store readmodwrite swap | address datum, mask, data | most modules typically only require the load/store 4 bytes for 32 bit systems, and load/store 8 bytes in 64 bit systems |
| composite operations | load group store group | address datum, mask, data | this gives a mechanism for a module to enforce groupings of data which contain more than a single word |
| | cache operations flush purge | address, address | these operations are targeted as hardware assist for coherency issues |
| locally defined | user operations | user defined | this allows system with specific need which are not addressed by standard operations to build custom operation types which can be supported transparently by the system |

In Table I, datum denotes the quantity of data/work the primitive operation is acting on. The qualifiers include packet qualifiers, such an address and mask as well as the operation qualifier defining the datum. The operations are defined in more detail in the following:

Load M Bytes

Definition

Transfer a single aligned word of m bytes from the target to the initiator.

Valid sizes for m are defined to be $2^n$ were n is an integer in the range 0–6.

Qualifiers address<31:n> the address of the word to be accessed address<n−1:0> the address of the most critical byte within the word. This ensures the system will return the critical byte as part of the first cell in the response packet.

mask<2^n−1:0> the mask indicates which bytes with the word are significant r_data<8×2^n−1:0> data to be transferred, the significance of bytes within this field is inferred from the mask information r_opcode result of operation Store M Bytes Definition Transfer a single aligned word of m bytes from the initiator to the target, overwriting the location at that address with the data transferred.

Valid sizes for m are defined to be $2^n$ where n is an integer in the range 0–6.

Qualifiers address<31:n> the address of the word to be accessed address<n−1:0> the address of the most critical byte within the word mask<2^n−1:0> the mask indicates which bytes with the word are significant data<8×2^n−1:0> data to be transferred RmodW M Bytes Definition Transfer the value of the aligned word of m bytes from the target to the initiator, leaving the target device "locked" until a second transfer from the initiator to the target completes, replacing the information held at that address in the target device.

Valid sizes for m are defined to be $2^n$ where n is an integer in the range 0–6.

Qualifiers address<31:n> the address of the word to be accessed address<n−1:0> the address of the most critical bytes within the word mask<2^n−1:0> the mask indicates which bytes with the word are significant data<8×2$^n$−1:0>: data to be transferred from the initiator to the target r_data<8×2$^n$−1:0> data to be transferred from the target to the initiator Swap M Bytes Definition Exchange the value of the single aligned word of m bytes from the initiator with the data held in the target location, returning the original target data to the initiator.

Valid sizes for m are defined to be 2$^n$ where n is an integer in the range 0–6.

Qualifiers address<31:n> the address of the word to be accessed address<n−1:0> the address of the most critical byte within the word mask<2^n−1:0> the mask indicates which bytes with the word are significant data<8×2$^n$−1:0> data to be transferred from the initiator to the target r_data<8×2$^n$−1:0>: data to be transferred from the target to initiator Load a Group of words of M bytes; Load Group Definition Transfer a group of single aligned words of m bytes from the target to the initiator.

The group consists of a number of elements, each of which contains m bytes, valid values for m are 2$^n$ where n is an integer in the range 0–6.

Qualifiers g*address<31:n>: the address of the word to be accessed g*address<n−1:0> the address of the most critical byte within the word g*mask<2^n1:0> the mask indicates which bytes within each word are significant g*r_data<8×2$^n$−1:0> data to be transferred, the significance of bytes within this field is inferred from the mask information The group contains g*m bytes of data, and is complete when eop is asserted on the final cell of the final word to be transferred.

The operation is a mechanism for the initiator to force the system to maintain a series of possibly unrelated operations as a single element.

Store a Group of Words of M Bytes: Store Group

Definition

Transfer a group of single aligned words of size m bytes from the initiator to the target, overwriting the information at that address with the data transferred.

The group consists of a number of elements, each of which contains m bytes, valid values for m are 2$^n$ where n is an integer in the range 0–6.

Qualifiers g*address<31:n> the address of the word to be accessed g*address<n−1:0> the address of the most critical byte within the word g*mask<2*n−1:0> the mask indicates which bytes with the word are significant g*r_data<8×2$^n$−1:0> data to be transferred The group contains g*m bytes of data, and is complete when eop is asserted on the final cell of the final word to be transferred.

This operation is a mechanism for the initiator to force the system to maintain a series of possibly unrelated operations as a single element.

The complete encodings are given in Tables IV and V.

TABLE IV

Primitive Operations

| operation | <7> | bit<6:4> | bit<3:0> |
|---|---|---|---|
| reserved | — | — | 0000 |
| load byte | 0 | 000 | 0001 |
| load two bytes | 0 | 001 | 0001 |
| load four bytes | 0 | 010 | 0001 |
| load eight bytes | 0 | 011 | 0001 |
| load sixteen bytes | 0 | 100 | 0001 |
| load thirty-two bytes | 0 | 101 | 0001 |
| load sixty-four bytes | 0 | 110 | 0001 |
| reserved | 0 | — | 0110 |
| reserved | — | — | 0011 |
| store byte | 0 | 000 | 0010 |
| store two bytes | 0 | 001 | 0010 |
| store four bytes | 0 | 010 | 0010 |
| store eight bytes | 0 | 011 | 0010 |
| store sixteen bytes | 0 | 100 | 0010 |
| store thirty-two bytes | 0 | 101 | 0010 |
| store sixty-four bytes | 0 | 110 | 0010 |
| swap four bytes | 0 | 010 | 0101 |
| swap eight bytes | 0 | 011 | 0101 |
| reserved | 0 | — | 0111 |

Primitive operations are always built from a single request/response packet pair.

TABLE V

Compound Operations

| operation | <7> | bit<6:4> | bit<3:0> |
|---|---|---|---|
| load group of bytes | 0 | 000 | 1001 |
| load group of two byte quantities | 0 | 001 | 1001 |
| load group of four byte quantities | 0 | 010 | 1001 |
| load group of eight byte quantities | 0 | 011 | 1001 |
| load group of sixteen byte quantities | 0 | 100 | 1001 |
| load group of thirty-two byte quantities | 0 | 101 | 1001 |
| load group of sixty-four byte quantities | 0 | 110 | 1001 |
| store group of bytes | 0 | 000 | 1010 |
| store group of two byte quantities | 0 | 001 | 1010 |
| store group of four byte quantities | 0 | 010 | 1010 |
| store group of eight byte quantities | 0 | 011 | 1010 |
| store group of sixteen byte quantities | 0 | 100 | 1010 |
| store group of thirty-two byte quantities | 0 | 101 | 1010 |
| store group of thirty-two byte quantities | 0 | 101 | 1010 |
| store group of sixty-four byte quantities | 0 | 110 | 1010 |

What is claimed is:

1. An integrated circuit comprising:

a. plurality of functional modules formed within said integrated circuit interconnected via a packet router formed within said integrated circuit, each functional module having packet handling circuitry for generating and receiving packets conveyed by the packet router;

wherein at least a first set of said functional modules, acting as initiator modules, have packet handling circuitry which includes request packet generation circuitry for generating request packets for implementing transactions, each request packet including a destination indicator identifying a destination of the packet and an operation field denoting the function to be implemented by the request packet, wherein the operation field comprises eight bits of which a single packet type bit denotes the type of the packet, four operation family bits denote the unction to be implemented by the packet and three operation qualifier bits act to qualify the function, and wherein a second set of the functional modules, acting as target modules, each have packet handling circuitry which includes packet receiver logic for receiving said request packets and for generating respective response packets, wherein the single packet type bit distinguishes between request packets and response packets.

2. An integrated circuit according to claim 1, wherein the function in each request packet is a memory access operation.

3. An integrated circuit according to claim 2, wherein one of said operation family bits distinguishes between primitive memory access operations involving a single request packet and compound memory access operations involving a plurality of request packets.

4. An integrated circuit according to claim 2, wherein the memory access operation includes cache operations.

5. An integrated circuit according to claim 1, wherein each request packet includes a data object, the size of which is denoted by the three bit operation qualifier.

6. An integrated circuit according to claim 1, wherein the four operation family bits denote that the operation field is user defined.

7. An integrated circuit comprising:
a plurality of functional modules formed in said integrated circuit and interconnected via a packet router formed in said integrated circuit, each functional module having packet handling circuitry for generating and receiving packets conveyed by the packet router,
wherein at least a first set of said functional modules acting as initiator modules, have packet handling circuitry which includes request packet generation circuitry for generating request packets for implementing transactions, each request packet including a destination indicator identifying a destination of the packet and an operation field denoting the function to be implemented by the request packet, wherein the operation field comprises eight bits of which a single packet type bit denotes the type of the packet, four operation family bits denote the function to be implemented by the packet and three operation qualifier bits act to qualify the function, and
wherein a second set of said functional modules, acting as target modules, each having packet handling circuitry which includes packet receiver logic for receiving said request packets and for generating respective response packets, wherein the single packet type bit distinguishes request packets and response packets.

8. An integrated circuit comprising:
a plurality of functional modules formed in said integrated circuit and interconnected via a packet router formed in said integrated circuit, each functional module having packet handling circuitry for generating and receiving packets conveyed by the packet router;
wherein each functional module has packet handling circuitry which includes request packet generation circuitry for generating request packets for implementing transactions, and packet receiver logic for receiving request packets and for generating respective response packets, each request packet including a destination indicator identifying a destination of the packet and an operation field denoting the function to be implemented by the packet, wherein the operation field comprises eight bits of which a single packet type bit distinguishes between request packets and response packets, four operation family bits denote the function to be implemented by the packet and three operation qualifier bits act to qualify the function.

9. An integrated circuit according to claim 8, wherein each request packet includes a data object, the size of which is denoted by the three bit operation qualifier.

10. An initiator functional module for connection in an integrated circuit comprising:
an interface for supplying and receiving packets to and from the functional module, said interface being connected to a port for connecting the functional module to a packet router, wherein both the initiator functional module and the packet router are formed within the integrated circuit;
packet handling circuitry for handling said packets and including request packet generating logic which generates request packets for supply to the packet router via the interface, each request packet having a destination indicator identifying a destination of the packet and an operation field denoting the function to be implemented by the request packet, wherein the operation field comprises eight bits of which a single packet type bit denotes a request or response packet, four operation family bits denote the function to be implemented by the packet and three operation qualifier bits act to qualify the function.

11. A target functional module for connection in an integrated circuit comprising:
an interface for supplying and receiving packets to and from the functional module, said interface being connected to a port for connecting a functional module to a packet router, wherein both the target functional module and the packet router are formed within the integrated circuit;
packet receiver logic which is operable to receive request packets supplied from the packet router via the interface to the target functional module, each request packet having an operation field denoting the function to be implemented by the request packet, said operation field including four operation family bits denoting the function to be implemented by the packet, one of said operation family bits distinguishing between primitive memory access operations and complex memory access operations, wherein the packet receiver logic comprises means for detecting the status of said one operation family bit to determine whether the memory access operation is primitive or compound; and
means for generating respective response packets on receipt of each request packet, wherein the operation field of bath request and response packets includes a single packet type bit which distinguishes between request packets and response packets.

12. A method of implementing transactions in an integrated circuit comprising a plurality of functional modules interconnected via a packet router, the method comprising:
at one of said functional modules acting as an initiator module within said integrated circuit, generating a request packet including a destination indicator identifying a destination of the packet within said integrated circuit and an operation field denoting the function to be implemented by the request packet, wherein the operation field comprises eight bits of which a single packet type bit denotes the type of a packet, four operation family bits denote the function to be implemented by the packet and three operation qualifier bits act to qualify the function;

at the destination indicated by the destination indicator, receiving said request packet and identifying the function to be implemented from the four operation family bits and the operation qualifier bits; and generating a response packet for transmission to the initiator functional module, wherein the single packet type bit distinguishes between request packets and response packets.

13. A method according to claim 12, wherein the function in each request packet is a memory access operation.

14. A method according to claim 13, wherein one of said operation family bits distinguishes between primitive memory access operations involving a single request packet and compound memory access operations involving a plurality of request packets, and wherein the method comprises detecting at the destination of the packet the status of this bit to determine whether a primitive memory access operation or a compound memory access operation is to be implemented.

15. A method according to claim 13, wherein said memory access operations include load, store, read-modify-write and swap operations.

16. A method according to claim 13, wherein said memory access operation includes cache operations.

17. A method according to claim 12, wherein each request packet includes a data object, the size of which is denoted by the three bit operation qualifier, the method comprising at the destination of the packet, detecting the size of said data object from the three bit operation qualifier to determine how to implement the function in the request packet.

18. A method according to claim 12, wherein said four operation family bits denote that the function defined in the operation field is user defined.

* * * * *